United States Patent
Kaltenrieder et al.

(10) Patent No.: US 11,449,010 B2
(45) Date of Patent: Sep. 20, 2022

(54) WATER-RESISTANT WATCH CASE

(71) Applicant: Omega SA, Biel/Bienne (CH)

(72) Inventors: Cedric Kaltenrieder, Courtelary (CH);
Gregory Kissling, La Neuveville (CH);
Yves Winkler, Schmitten (CH)

(73) Assignee: Omega SA, Biel/Bienne (CH)

( * ) Notice: Subject to any disclaimer, the term of this patent is extended or adjusted under 35 U.S.C. 154(b) by 246 days.

(21) Appl. No.: 16/847,818

(22) Filed: Apr. 14, 2020

(65) Prior Publication Data

US 2020/0356060 A1 Nov. 12, 2020

(30) Foreign Application Priority Data

May 8, 2019 (EP) .................................... 19173329

(51) Int. Cl.
*G04B 37/08* (2006.01)
*G04B 45/00* (2006.01)
*F16J 15/08* (2006.01)

(52) U.S. Cl.
CPC .......... *G04B 37/08* (2013.01); *F16J 15/0806* (2013.01); *G04B 45/0084* (2013.01)

(58) Field of Classification Search
CPC .. G04B 45/0084; G04B 37/084; G04B 39/02; G04B 37/08; G04B 37/082;

(Continued)

(56) References Cited

U.S. PATENT DOCUMENTS 4,104,867 A * 8/1978 Worsham ............. G04B 37/113
368/291
4,403,870 A * 9/1983 Thompson ......... G04B 37/0008
368/286

(Continued)

FOREIGN PATENT DOCUMENTS

CH 217284 10/1941
CH 378792 11/1963

(Continued)

OTHER PUBLICATIONS

Russian Office Action dated Nov. 19, 2020 in Russian Patent Application No. 2020115131/28(025060) (with English language translation), 9 pages.

(Continued)

*Primary Examiner* — Edwin A. Leon
(74) *Attorney, Agent, or Firm* — Oblon, McClelland, Maier & Neustadt, L.L.P.

(57) ABSTRACT

A water-resistant watch case of a diving watch, includes a back mounted on a lower side of a middle part, and a crystal mounted on an upper side of the middle part. The crystal includes an annular peripheral surface mounted by a first portion of an annular gasket made of amorphous metal on an inner annular surface that is complementary in shape, on the upper side of the middle part. A second portion of the gasket on the first portion of the gasket maintains the crystal against the middle part. The annular peripheral surface of the crystal is inclined towards the inside of the watch case at an angle less than 90° relative to a central axis perpendicular to the plane of the watch case to distribute stresses between the crystal and the middle part due to the water pressure.

15 Claims, 3 Drawing Sheets

(58) Field of Classification Search
CPC ............ G04B 39/025; G04B 37/085; G04B 45/0076; G04B 45/0015; G04B 39/006; G04B 45/00; G04B 39/00; F16J 15/0806
See application file for complete search history.

(56) References Cited

U.S. PATENT DOCUMENTS

| | | | | |
|---|---|---|---|---|
| 4,493,562 A * | 1/1985 | Gagnebin | ............. | G04B 39/00 368/294 |
| 4,924,453 A * | 5/1990 | Ray | ............. | G04B 39/02 368/282 |
| 5,333,123 A * | 7/1994 | Plancon | ............. | G04B 37/225 368/294 |
| 5,467,325 A * | 11/1995 | Juillerat | ............. | G04B 37/11 368/291 |
| 8,777,480 B2 * | 7/2014 | Silvant | ............. | G04B 19/283 368/295 |
| 2014/0178625 A1 | 6/2014 | Lauper et al. | | |
| 2016/0263698 A1 | 9/2016 | Noirot et al. | | |
| 2019/0094817 A1 | 3/2019 | Kitamura et al. | | |

FOREIGN PATENT DOCUMENTS

| | | |
|---|---|---|
| CH | 516 188 | 8/1971 |
| CH | 690 870 A5 | 2/2001 |
| CN | 2270240 Y | 12/1997 |
| CN | 1187642 A | 7/1998 |
| CN | 1313533 A | 9/2001 |
| CN | 1404355 A | 3/2003 |
| CN | 201205973 Y | 3/2009 |
| CN | 108885432 A | 11/2018 |
| CN | 109478044 A | 3/2019 |
| DE | 2 127 079 A | 2/1972 |
| DE | 2 127 079 B2 | 1/1973 |
| EP | 3 067 220 A1 | 9/2016 |
| EP | 3 163 380 A1 | 5/2017 |
| EP | 3 181 006 A1 | 6/2017 |
| GB | 1153764 | 5/1969 |
| JP | 61-254884 A | 11/1986 |
| JP | 2014-121608 A | 7/2014 |
| JP | 2016-506264 A | 3/2016 |
| LU | 100047 B1 | 6/2017 |
| WO | WO 99/21061 A1 | 4/1999 |
| WO | WO 2014/096260 A1 | 6/2014 |

OTHER PUBLICATIONS

Japanese Office Action dated Feb. 9, 2021 in Japanese Patent Application No. 2020-075900.
European Search Report dated Nov. 20, 2019 in European Application 19173329.4 filed May 8, 2019 (with English Translation of Categories of Cited Documents & Written Opinion), 14 pages.
Combined Chinese Office Action and Search Report dated Apr. 1, 2021 in Patent Application No. 202010377810.4 (with English lanaguage translation and English translation of Category of Cited Documents), 14 pages.

* cited by examiner

WATER-RESISTANT WATCH CASE

CROSS-REFERENCE TO RELATED APPLICATION

This application claims priority to European Patent Application No. 19173329.4 filed on May 8, 2019, the entire disclosure of which is hereby incorporated herein by reference.

TECHNICAL FIELD

The present invention relates to a water-resistant watch case in particular for a diving watch.

TECHNOLOGICAL BACKGROUND

To provide for the use of a mechanical or electronic watch underwater, the watch case, which comprises a horological movement or a time-based horological module, must be sealingly closed. For this purpose, the watch case comprises a back sealingly fastened to a first side of a middle part and a crystal fastened to a second opposite side of the middle part. Packings are provided for the assembly of the back, the middle part and the crystal of the watch. A watch function control or setting member is also sealingly mounted through the middle part of the case in the rest position.

Generally watch cases are not configured or assembled to withstand high water pressures, for example during a dive since the pressure inside the watch case is close to atmospheric pressure. Simple packings of traditional watches are not enough to guarantee a good water resistance of the case during a dive to very large depths underwater.

Mention may be made of the patent application CH 690 870 A5 which describes a water-resistant watch case. The watch case consists of a crystal fastened on an upper side to a middle-bezel and a back fastened to the middle part by screwing it to an internal tapping of the middle part. The crystal is fastened to the middle part by an annular packing of a toroidal shape and bearing on a rim of the middle part. A packing is also provided between an outer rim of the back and a lower surface of the middle part. As the tapping can be damaged at high water pressure, a dome made of a resistant metal is also provided, bearing against an inner surface of the back and against an inner edge of the middle part. However, even with such a watch case arrangement, this does not allows guaranteeing a good water-resistance of the case during a dive to very large depths underwater, which constitutes a disadvantage.

The patent CH 372 606 describes a water-resistant watch case, which has a central portion or middle part surrounding a back and closed by a crystal. A threaded ring is bearing against an inclined outer surface of the back to retain it, and is screwed to a fastening portion connected to the middle part. With such an arrangement presented, this does not allow guaranteeing a good water-resistance of the case during a dive to very large depths underwater, which constitutes a disadvantage.

SUMMARY OF THE INVENTION

Therefore, the main purpose of the invention is to overcome the disadvantages of the prior art described above by proposing a water-resistant watch case adapted to withstand the high water pressure for diving to large depths under water.

To this end, the present invention relates to a water-resistant watch case, which comprises the features of the independent claim 1.

Particular embodiments of a water-resistant watch case are defined in the dependant claims 2 to 15.

An advantage of the water-resistant watch case lies in the fact that the crystal is fastened to the middle part by means of a gasket and with inclined contact surfaces of the middle part and the crystal. In the case of a generally cylindrical middle part, conical bearing surfaces are provided on the crystal and the middle part, or also on the back mounted on an opposite side of the middle part. In this way, pressure forces on the crystal and the back are transmitted to the middle part via conical bearing surfaces.

In the case of the crystal, the strength thereof and the water-resistance of the link thereof with the middle part can be ensured by a second portion of the fastening gasket made of polymer (for example polyurethane). The pressure stresses are transmitted to a first portion of the gasket, which is made of a metal having mechanical properties that are superior to those of the middle part, in particular a higher yield strength and ideally a higher elastic deformation. This can be a gasket made of an amorphous metal alloy or TNTZ—O alloy (TiNb23Ta0.7Zr2O1.2) for a middle part made of titanium. This prevents concentrations of stresses on the one hand on the middle part and thus prevents the plasticising thereof, and on the other hand on the crystal and thus prevents breakage thereof and/or a reduction in the thickness thereof. The first portion of the metal gasket can be a component that is deposited on the conical bearing surface of the middle part before assembling the crystal. The first portion of the gasket can thus have been rigidly connected to the middle part in a prior step (for example by hot working or additive manufacturing) and thus form an integral part of the middle part when assembling the crystal.

BRIEF DESCRIPTION OF THE FIGURES

The purposes, advantages and features of a water-resistant watch case will appear better in the following description in a non-limiting manner with reference to the drawings wherein.

DETAILED DESCRIPTION OF THE INVENTION

In the following description, all the components of a case of a water-resistant watch, in particular a diving watch, which are well known to a person skilled in the art in this technical field are only stated in a simplified manner.

Figure 1A:
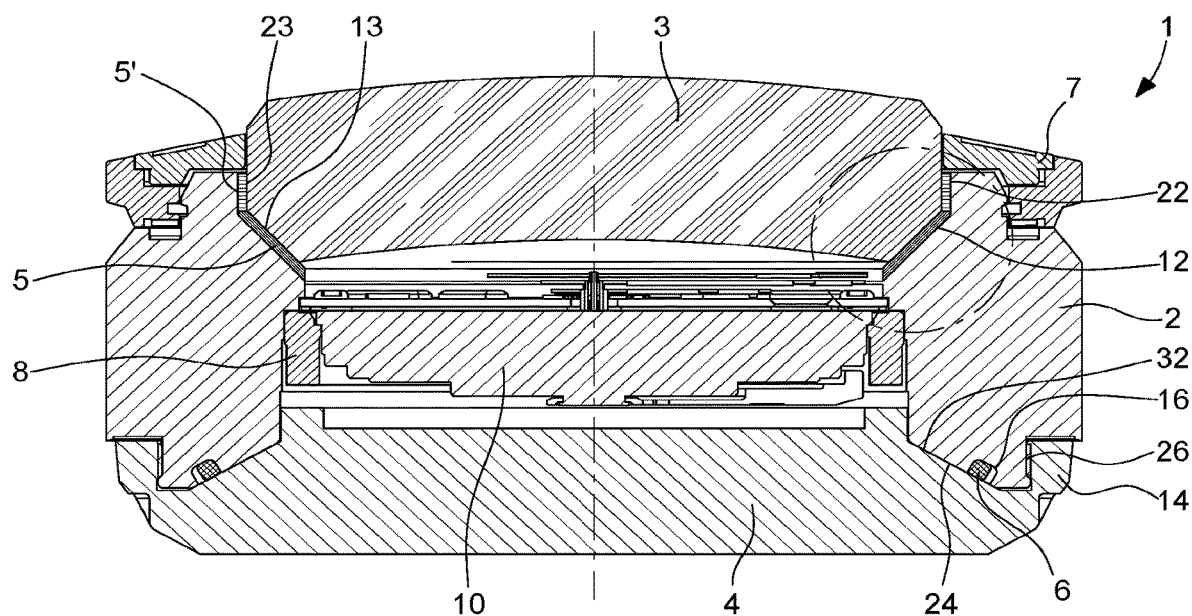
FIGS. 1a and 1b show in a simplified manner a cross-section of one embodiment of a watch with a water-resistant case according to the invention, and a partial detail section of the fastening of the crystal to the middle part according to the invention.
Figure 1B:
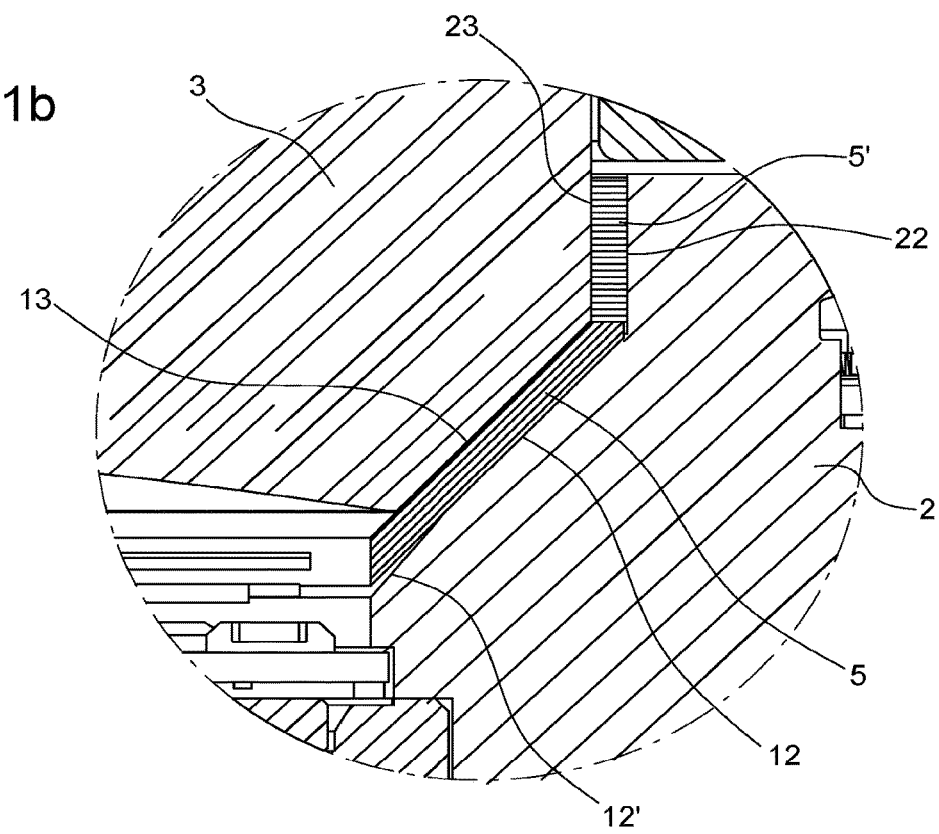

FIGS. 1a and 1b show one embodiment of a watch case 1, which can be used for a diving watch. The watch case 1 essentially comprises a crystal 3, which can be made of sapphire or mineral crystal, fastened on an upper side of a middle part 2, and potentially a back 4 mounted on a lower side of the middle part 2. A bezel 7 can also be mounted on the upper side of the middle part 2. A horological movement or module 10 is disposed in the watch case 1 in a casing circle 8, and at least one control member, not shown, can be sealingly mounted in a rest position on or through the middle part 2 for setting the time, the date or other functions of the diving watch.

In the case where a back 4 of the watch case 1 is provided, the back 4, the structure whereof is preferably solid, comprises an annular rim 14 with internal tapping so as to be screwed onto a tapping 26 on the lower side of the middle part 2. An annular bearing surface 24 of the back 4 comes into contact with an inner annular surface 32 of the middle part 2 of a shape complementary to the bearing surface 24 when mounting the back 4 on the middle part 2. The bearing 24 and inner 32 surfaces are inclined at a determined angle relative to an axis perpendicular to a plane of the watch case 1. In the case of a middle part of a generally cylindrical shape, the surfaces 24, 32 are conical in shape and are inclined towards the inside of the watch case 1 at a determined angle relative to a central axis of the watch case 1. This means that the top of each cone shape is in the direction of the inside of the watch case 1. The lower side of the middle part 2 also comprises an annular groove 16 housing a packing 6 in contact with the bearing surface 24 when the back 4 is mounted on the middle part 2. The annular groove 16 has a rectangular cross-section so that the packing 6 is properly maintained in the annular groove 16 before fastening the back 4. For a middle part 2 and a back 4, made of a material, such as titanium, the angle can be of the order of 60°±5° relative to the central axis. This allows having a good stress distribution between the back 4 and the middle part 2 due to the water pressure during a dive to large depths underwater.

The crystal 3 comprises an annular peripheral surface 13 to be mounted by means of at least one portion of a gasket 5, 5' on an inner annular surface 12 on the upper side of the middle part 2. The inner annular surface 12 is preferably of a shape complementary to the annular peripheral surface 13. The annular peripheral surface 13 of the crystal 3 is inclined at a defined angle less than 90° relative to an axis perpendicular to a plane of the watch case 1. Preferably, the inner annular surface 12 is inclined generally towards the inside of the watch case 1 at the same angle as the annular peripheral surface 13 relative to a central axis.

Although the middle part 2, for example made of titanium, is of a generally cylindrical shape, the inner peripheral surface 13 and the inner annular surface 12 are conical in shape and inclined at a defined angle towards the inside of the watch case. This means that the top of each cone shape is in the direction of the inside of the watch case 1. The defined angle of inclination of the surfaces 12 and 13 can be of the order of 43°±5° relative to the central axis. This allows having a good stress distribution between the crystal 3 and the middle part 2 by means of the first portion 5 of the gasket due to the water pressure during a dive to large depths underwater. The difference in water pressure compared to the pressure inside the watch case 1 tends to close any interstice between the surfaces 12, 13 in contact and the fastening gasket 5, 5' thanks to the inclination of the contact surfaces towards the inside of the watch case 1. This guarantees a good water-resistance and withstanding to high pressures.

In this first embodiment, the fastening gasket 5, 5' may preferably be composed of a first portion 5 made of amorphous metal alloy and of a second portion 5' made of polymer (for example polyurethane) for retaining the crystal 3 with the middle part 2. The fastening gasket 5, 5' is of an annular shape for the hermetic closure of the crystal 3 on the middle part 2. For a middle part 2 of a generally cylindrical shape, the first portion 5 of the gasket is conical in shape, while the second portion 5' bears on the upper rim of the first portion 5 and is cylindrical. Once the crystal 3 is driven onto the middle part 2, the first portion 5 links the inclined surfaces of the middle part 2 and of the crystal 3 bearing on the first portion 5, while the second portion 5' is compressed between the inner annular wall 22 of the middle part 2 and the outer annular wall 23 of the crystal 3 above the annular peripheral surface 13 of the crystal 3. The second portion 5' can stop at mid-height of the crystal 3 just below the bezel 7, while the first portion 5 of the gasket can extend below the level of the link between the bottom of the crystal 3 and the middle part 2.

In a non-limiting manner, the length of the first portion 5 in cross-section can be of the order of 5 mm, while the height of the second portion of the gasket 5, 5' can be of the order of 2.5 mm. The thickness of the gasket can be of the order of 0.65 mm.

The first portion 5 of the gasket is of the type that carries the crystal 3 on the middle part 2. When the watch case 1 is submerged underwater to large depths, this allows any space between the crystal 3 and the middle part 2 to be closed thanks to the inclined surfaces 12 and 13 of the crystal 3 and the middle part 2 and by means of the first metal portion 5 of the gasket. A good stress distribution is therefore achieved between the crystal 3 and the middle part 2 thanks to the first metal portion 5 of the gasket, which is preferably made of amorphous metal alloy.

When the watch case 1 is submerged underwater to shallow depths, the portion 5' of the gasket ensures the water resistance and the strength of the crystal on the middle part. The more the case is submerged underwater at large depths, the more the crystal is compressed against the portion 5 of the gasket which is itself compressed against the inclined plane of the middle part, which ensures the water resistance even at very large depths without the risk of deterioration of the gasket. At large depths, the portion 5' of the gasket presses against the top of the portion 5 of the gasket, which prevents the portion 5' from being deteriorated by extrusion. The use of a material having very high mechanical properties (in particular the yield strength and elastic deformation) for the portion 5 of the gasket is necessary in order to prevent the plasticising thereof and ensure homogenisation of the stresses on the middle part when diving with the watch at large depths.

For example, the specific mechanical properties of the amorphous metals, in particular the very high yield strength $\sigma_e$ thereof (for example: 1,700 MPa for a Zr base; 1,550 MPa for a Pd base; 1,350 MPa for a Pt base) coupled with a very high elastic deformation $\varepsilon_e$ (1.5 to 2% for all amorphous metals), prevent the plasticising of the gasket 5, 5' in the contact area thereof with the crystal 3 when being stressed under very high pressures. The middle part 2, whose mechanical properties (for example for grade 5 titanium: $\sigma_e$ 850 MPa; $\varepsilon_e$ 0.5 to 0.8%) are inferior to those of the amorphous metals selected for the gasket, also does not plasticise since the gasket 5, 5' made of amorphous metal allows the stresses to be homogenised, which stresses are thus reduced at the gasket—middle part interface.

Another example of an alloy of interest for the manufacture of the gasket 5 is an alloy of the type TNTZ-O (TiNb23Ta0.7Zr2O1.2) which has a yield strength of 1,000-2,000 MPa with an elastic deformation of the order of 1-2%.

For information purposes, the production of the first portion 5 of the gasket made of amorphous metal can be done by different shaping methods, namely:

directly from the molten metal such as, for example, pressure injection, gravitational casting, centrifugal casting, anti-gravitational casting, suction casting, additive powder manufacturing,
  from amorphous preforms by hot deformation above the glass transition temperature such as for example, electromagnetic forming, forming by capacitive discharge, forming under gas pressure, mechanical forming. The objective of this step is to obtain a preform having the correct dimensions and having enough proportion of amorphous phase to obtain suitable mechanical properties.

It should also be noted that the inner annular surface 12 of the middle part 2 is inclined towards the inside of the watch case 1 and ends with a surface 12' curved inwards on approximately 3° after the inner annular surface 12. Thus the first portion 5 of the gasket is no longer in direct contact with this curved surface 12'. On the other hand, when the water pressure increases substantially when diving, the first portion 5 of the gasket is pushed by the crystal 3 inwards to contact or conform to the curved surface 12'. Thus, this allows preventing the pressure of the inner corner of the crystal 3 from concentrating the stresses in the first portion 5 of the gasket, risking breaking it.

Several types of amorphous metal alloys can be used to make the first portion 5 of the fastening gasket. In the most frequent cases, the amorphous metal alloy can be mainly composed of zirconium. The zirconium-based amorphous metal alloy can be composed of Zr(52.5%), Cu (17.6%), Ni (14.9%), Al (10%) and Ti (5%). The zirconium-based amorphous metal alloy may also comprise Zr (58.5%), Cu (15.6%), Ni (12.8%), Al (10.3%) and Nb (2.8%). The zirconium-based amorphous metal alloy may also comprise Zr (44%), Ti (11%), Cu (9.8%), Ni (10.2%) and Be (25%), or finally Zr (58%), Cu (22%), Fe (8%) and Al (12%). The first portion of the gasket can also be made of amorphous metal alloy mainly composed of platinum (Pt). The platinum-based amorphous metal alloy may comprise Pt (57.5%), Cu (14.7%), Ni (5.3%) and P (22.5%). It is also possible to provide for making the first portion of the gasket of an amorphous metal alloy based mainly on palladium (Pd).

Other amorphous metal alloys can also be mentioned. A titanium-based amorphous metal alloy may comprise Ti (41.5%), Zr (10%), Cu (35%), Pd (11%) and Sn (2.5%). A palladium-based amorphous metal alloy may comprise Pd (43%), Cu (27%), Ni (10%) and P (20%), or Pd (77%), Cu (6%) and Si (16.5%), or finally Pd (79%), Cu (6%), Si (10%) and P (5%). A nickel-based amorphous metal alloy may comprise Ni (53%), Nb (20%), Ti (10%), Zr (8%), Co (6%) and Cu (3%), or Ni (67%), Cr (6%), Fe (4%), Si (7%), C (0.25%) and B (15.75%), or finally Ni (60%), Pd (20%), P (17%) and B (3%). An iron-based amorphous metal alloy may comprise Fe (45%), Cr (20%), Mo (14%), C (15%) and B (6%), or Fe (56%), Co (7%), Ni (7%), Zr (8%), Nb (2%) and B (20%). A gold-based amorphous metal alloy may comprise Au (49%), Ag (5%), Pd (2.3%), Cu (26.9%) and Si (16.3%).

Figure 2:
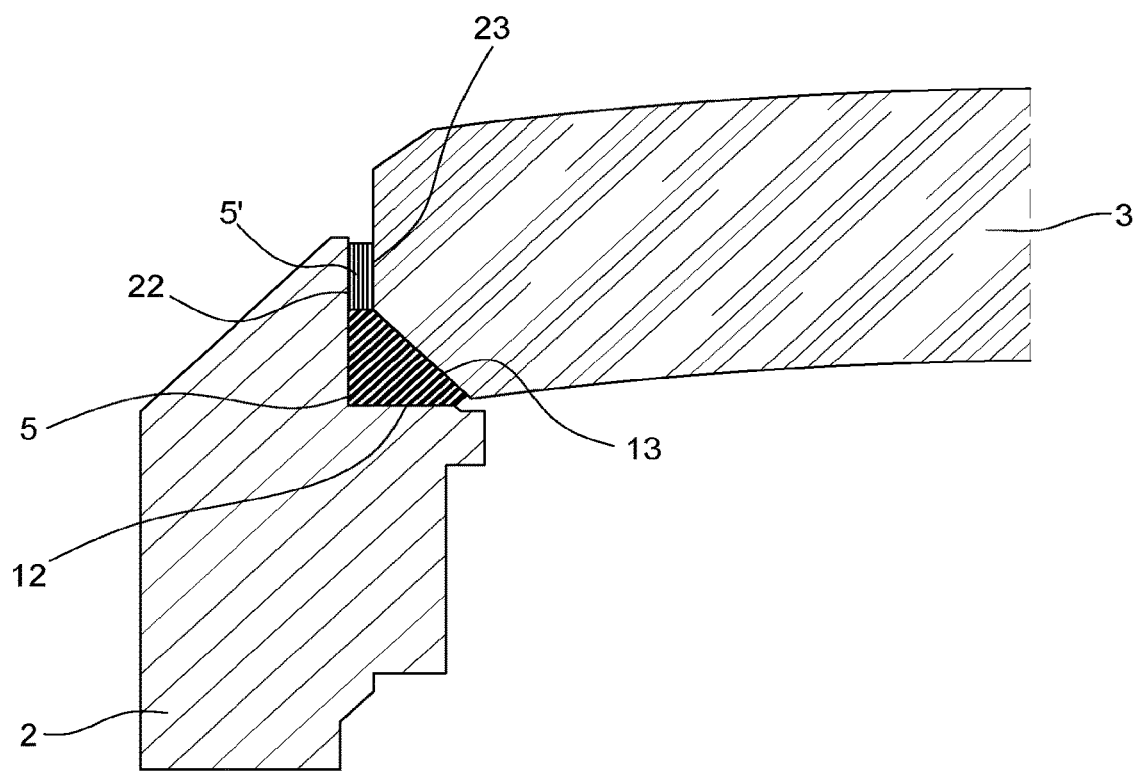
FIG. 2 shows a partial detail section view of one variant for the fastening of the crystal to the middle part according to the invention, FIG. 3 diagrammatically shows an overhead view of one embodiment of a watch case according to the invention.

FIG. 2 shows a partial detail section of one variant for the fastening of the crystal 3 to the middle part 2. The crystal 3 comprises an annular peripheral surface 13 to be mounted by means of a first portion 5 of the gasket on an inner annular surface 12 on the upper side of the middle part 2. Although the middle part 2 is cylindrical overall, the inner peripheral surface 13 of the crystal 3 is conical in shape, whereas the inner annular surface 12 of the middle part 2 is in the plane of the watch case 1 in the shape of a portion of a disc. The first portion 5 of the gasket made of metal alloy that is at least partially amorphous is between the inner peripheral surface 13 and the inner annular surface 12, whereas the second portion 5' of the gasket made of polymer is between the inner annular wall 22 of the middle part 2 and the outer annular wall 23 of the crystal 3.

Figure 3:
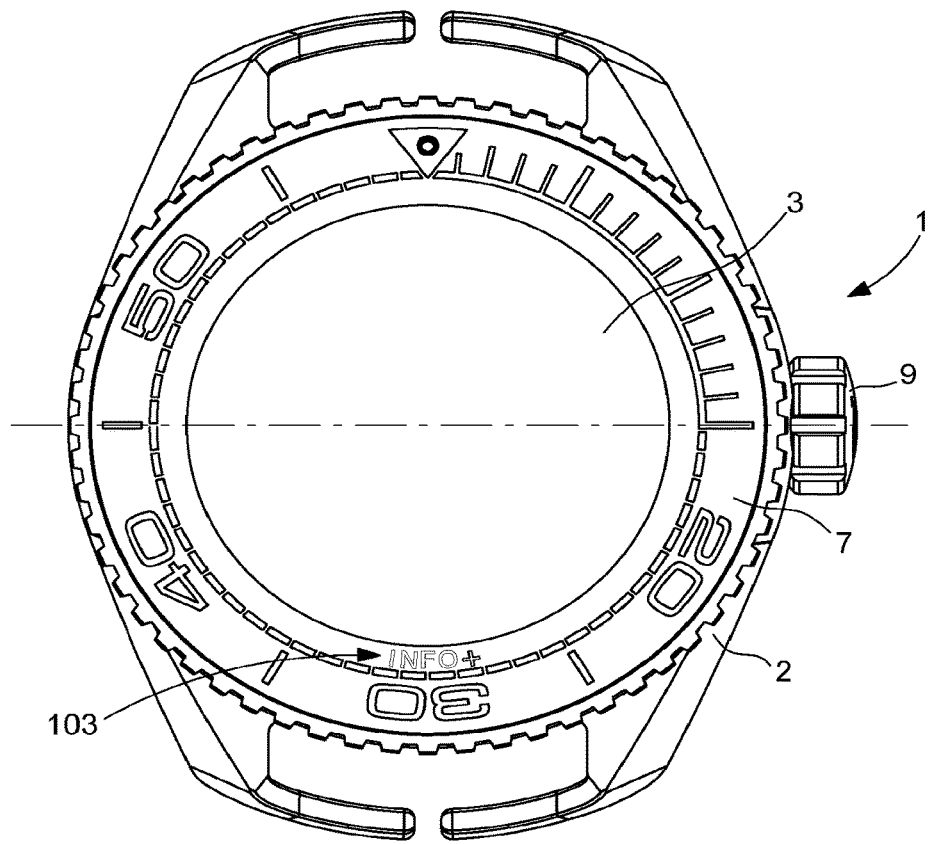

FIG. 3 diagrammatically shows an overhead view of one embodiment of a watch case 1. The watch case 1 comprises the middle part 2, the crystal 3, a bezel 7 and a control member 9 in the form of a stem-crown passing through the middle part 2. The stem-crown comprises a conical surface, not shown, in contact with a conical inner surface of the middle part 2 in the rest position to ensure the water-tight seal and ability to withstand the water pressure during a dive. An inscription 103 of a word or a number or drawings is made at the connection between the annular peripheral surface 13 of the crystal 3 and the first portion of the fastening gasket.

Figure 4A:
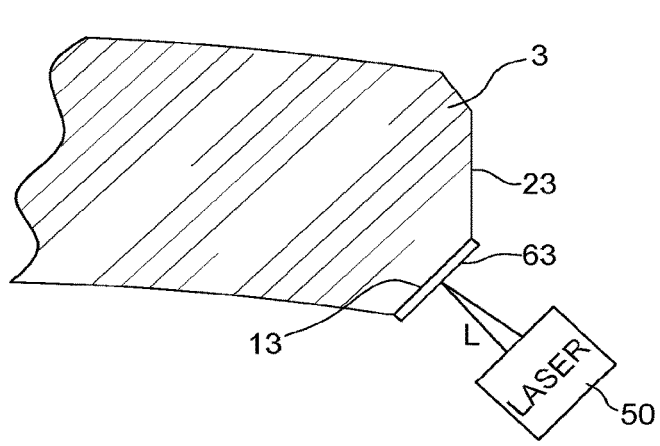
FIGS. 4a and 4b show a crystal with a metal coating capable of being etched by a laser to produce an inscription on the surface for mounting the crystal on the middle part, and a portion of the metal coating on the crystal with the inscription according to the invention.
Figure 4B:
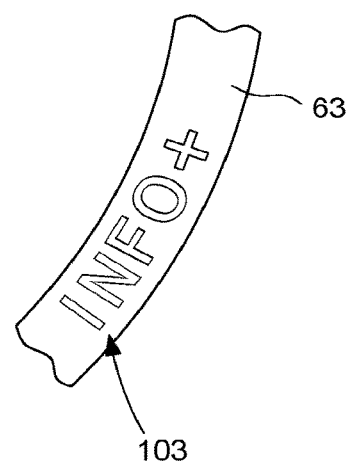

As shown in FIGS. 4a and 4b, to produce the inscription 103, a structured contact surface of the crystal 3 can also be provided and/or a decorative layer can also be deposited on the surface thereof. This structuring and/or deposit 63 can be disposed on the annular peripheral surface 13 of the crystal 3. One or more words, or numbers or drawings can also be written by etching the deposit 63 by means of a laser beam L originating from a laser device 50. The deposit 63 can have a different colour to that of the first portion of the fastening gasket. As a result, after the etching of the inscription 103 on the deposit 63, the annular peripheral surface 13 of the crystal 3 can be placed or fastened onto the first portion of the fastening gasket, which has a colour different to that of the deposit 63.

A pattern can also be created on the contact surface of the crystal 3 by selective structuring of the surface thereof. The surface can be structured, for example, by a laser, by a chemical method or even by a mechanical method (for example grinding or milling). Thus, once the crystal 3 has been fastened to the middle part 2, the inscription produced can be read through the crystal 3, which can also indicate the brand of the watch.

It should also be noted that with the fastening of the crystal 3 on the middle part 2 by the second portion 5' of the gasket described above and with the contact of conical surfaces between the crystal 3 and the middle part 2 by means of the first portion 5 of the gasket, a perfect water-resistance and a good stress distribution between the crystal 3 and the middle part 2 are guaranteed. This is necessary since the watch is a diving watch, which must withstand high stresses due to the pressure difference between the inside of the watch and the water pressure in large depths underwater. As the contact surface between the middle part 2, the gasket 5, 5' and the crystal 3 is quite large with this conical shape, there is a better transmission of stresses over a larger area, which is important to guarantee the water-resistance of the watch when diving deep underwater. With this arrangement, the water pressure on the watch case tends to close any interstice between the contact surfaces. In addition, this prevents the extrusion of the fastening gasket.

From the description which has just been made, several alternative embodiments of the watch case can be designed by a person skilled in the art without departing from the scope of the invention defined by the claims. The watch case by its middle part may have a general shape different from a cylinder.

What is claimed is:

1. A water-resistant watch case for a diving watch, the watch case comprising:
    at least one crystal separately mounted on an upper side of a middle part, wherein
    the crystal comprises an annular peripheral surface to be mounted with at least one portion of a gasket, that is annular in shape, of the watch case on an inner annular surface on the upper side of the middle part, the gasket being located between the crystal and the middle part and configured to extend below a level of a link between a bottom of the crystal and the middle part, and
    the annular peripheral surface of the crystal is inclined towards the inside of the watch case at a determined angle less than 90° relative to a central axis perpendicular to a plane of the watch case so as to distribute stresses between the crystal and the middle part due to water pressure during a dive.

2. The watch case according to claim 1, wherein the portion of the gasket between the annular peripheral surface and the inner annular surface is made of metal alloy that is at least partially amorphous.

3. The watch case according to claim 1, wherein the inner annular surface on the upper side of the middle part is of a shape complementary to the annular peripheral surface of the crystal.

4. The watch case according to claim 3, wherein the gasket is composed of a first portion arranged between the annular peripheral surface of the crystal and the inner annular surface of the middle part, and of a second portion in contact between an inner annular wall of the middle part above the inner annular surface and an outer annular wall of the crystal above the annular peripheral surface.

5. The watch case according to claim 4, wherein the inner annular wall of the middle part and the outer annular wall of the crystal are parallel to the central axis.

6. The watch case according to claim 4, wherein
    the first portion of the gasket is made of metal alloy that is at least partially amorphous, and
    the second portion of the gasket is made of polymer to fasten the crystal to the middle part.

7. The watch case according to claim 2, wherein the amorphous metal alloy of at least one portion of the gasket is based mainly on zirconium.

8. The watch case according to claim 2, wherein the amorphous metal alloy of at least one portion of the gasket is based mainly on platinum.

9. The watch case according to claim 2, wherein the amorphous metal alloy of at least one portion of the gasket is based mainly on palladium.

10. The watch case according to claim 4, wherein
    the annular peripheral surface of the crystal and the inner annular surface of the middle part are conical surfaces, and
    the inner annular wall of the middle part and the outer annular wall of the crystal are cylindrical surfaces.

11. The watch case according to claim 1, wherein a defined angle of an inclination of the annular peripheral surface of the crystal is of an order of 43°±5° relative to the central axis.

12. The watch case according to claim 4, wherein a defined angle of an inclination of the annular peripheral surface of the crystal and of the inner annular surface of the middle part is of an order of 43°±5° relative to the central axis.

13. The watch case according to claim 1, wherein the annular peripheral surface of the crystal comprises a deposit for etching an inscription by a laser beam.

14. The watch case according to claim 13, wherein a color of the deposit is different from a color of a first portion of the gasket so as to view the inscription through the crystal from outside the watch case.

15. The watch case according to claim 1, wherein the annular peripheral surface of the crystal comprises a structuring to create a decoration.

* * * * *